US012670297B2

(12) United States Patent
Baryshnikov

(10) Patent No.: US 12,670,297 B2
(45) Date of Patent: Jun. 30, 2026

(54) PRIVACY PROTECTION OF DIGITAL IMAGE DATA ON A SOCIAL NETWORK

(71) Applicant: Bumble IP Holdco LLC, Wilmington, DE (US)

(72) Inventor: Daniil Baryshnikov, London (GB)

(73) Assignee: BUMBLE IP HOLDCO LLC, Wilmington, DE (US)

( * ) Notice: Subject to any disclaimer, the term of this patent is extended or adjusted under 35 U.S.C. 154(b) by 166 days.

(21) Appl. No.: 18/480,690

(22) Filed: Oct. 4, 2023

(65) Prior Publication Data

US 2024/0119184 A1 Apr. 11, 2024

Related U.S. Application Data

(60) Provisional application No. 63/413,505, filed on Oct. 5, 2022.

(51) Int. Cl.
*G06F 21/84* (2013.01)
*G06F 21/62* (2013.01)
(Continued)

(52) U.S. Cl.
CPC .......... *G06F 21/84* (2013.01); *G06F 21/6263* (2013.01); *G06T 5/70* (2024.01);
(Continued)

(58) Field of Classification Search
CPC ...... G06T 5/70; G06V 40/168; G06V 40/172; G06V 10/70; G06V 20/30; G06F 21/84;
(Continued)

(56) References Cited

U.S. PATENT DOCUMENTS 5,858,139 A 1/1999 Ouderkirk et al.
5,993,940 A 11/1999 Ouderkirk et al.
(Continued)

FOREIGN PATENT DOCUMENTS

WO WO 2014/028009 2/2014
WO WO 2018/125762 7/2018

OTHER PUBLICATIONS

International Search Report and Written Opinion in International Appln. No. PCT/IB2023/059979, mailed on Nov. 17, 2023, 15 pages.

*Primary Examiner* — Tauqir Hussain
(74) *Attorney, Agent, or Firm* — Perkins Coie LLP

(57) ABSTRACT

Methods, systems, and apparatus for privacy protection of digital image data on a social network. In one aspect, a method includes obtaining, from a first client device associated with a first user, digital image data. The first user is one of a plurality of users of a social network. The method includes determining that the digital image data includes an image of multiple unique faces; applying, to the digital image data, a machine learning model configured to identify, among the multiple unique faces, a face of the first user; obscuring, in the digital image data and based on a user preference specifying a mode of obscuring, the multiple unique faces except the face of the first user; storing the digital image data having the obscured faces in a database; and associating the stored digital image data with a profile associated with the first user in the social network.

19 Claims, 16 Drawing Sheets

600

Obtain, from a first client device associated with a first user, digital image data, wherein the first user is one of a plurality of users of a social network — 602

Determine that the digital image data includes an image of multiple unique faces — 604

Apply, to the digital image data, a machine learning model configured to identify, among the multiple unique faces, a face of the first user — 606

Obscure, in the digital image data and based on a user preference specifying a mode of obscuring, the multiple unique faces except the face of the first user — 608

Store the digital image data having the obscured faces in a database — 610

Associate the stored digital image data with a profile associated with the first user in the social network — 612

(51) Int. Cl.
   *G06T 5/70*         (2024.01)
   *G06V 10/70*      (2022.01)
   *G06V 40/16*      (2022.01)

(52) U.S. Cl.
   CPC ............ *G06V 10/70* (2022.01); *G06V 40/168*
       (2022.01); *G06V 40/172* (2022.01); *G06T*
       *2207/20081* (2013.01); *G06T 2207/20212*
       (2013.01); *G06T 2207/30201* (2013.01)

(58) Field of Classification Search
   CPC ... G06F 21/6263; G06F 21/6245; G06F 21/08
   USPC ........................................................ 726/28
   See application file for complete search history.

(56)             References Cited

U.S. PATENT DOCUMENTS

| | | | |
|---|---|---|---|
| 6,067,399 | A | 5/2000 | Berger |
| 7,688,282 | B2 | 3/2010 | Motoe |
| 7,783,075 | B2 | 8/2010 | Zhang et al. |
| 7,911,513 | B2 | 3/2011 | Garrison et al. |
| 8,126,190 | B2 | 2/2012 | Jung et al. |
| 8,571,354 | B2 | 10/2013 | Miksa et al. |
| 8,610,787 | B2 | 12/2013 | Namba et al. |
| 8,875,034 | B2 | 10/2014 | Roulliere et al. |
| 8,922,480 | B1 | 12/2014 | Freed et al. |
| 8,923,647 | B2 | 12/2014 | Kothari |
| 8,973,149 | B2 | 3/2015 | Buck |
| 9,104,886 | B1 | 8/2015 | Dolbakian et al. |
| 9,124,730 | B2 | 9/2015 | Kurabayashi et al. |
| 9,124,762 | B2 | 9/2015 | Cutler et al. |
| 9,235,711 | B1 | 1/2016 | Xavier et al. |
| 9,313,454 | B2 | 4/2016 | Lalonde et al. |
| 9,350,914 | B1 | 5/2016 | Kaur et al. |
| 9,358,926 | B2 | 6/2016 | Lambert et al. |
| 9,396,354 | B1 | 7/2016 | Murphy et al. |
| 9,600,688 | B2 | 3/2017 | Buck et al. |
| 9,600,715 | B2 | 3/2017 | Natan et al. |
| 9,679,194 | B2 * | 6/2017 | Ra ........................ G06V 40/172 |
| 9,721,144 | B2 | 8/2017 | Shuster |
| 9,729,824 | B2 | 8/2017 | Cutler et al. |
| 9,785,796 | B1 | 10/2017 | Murphy et al. |
| 9,875,530 | B2 | 1/2018 | Traff |
| 9,911,002 | B2 | 3/2018 | Shim et al. |
| 9,953,187 | B2 | 4/2018 | Rylski |
| 9,984,729 | B2 | 5/2018 | Steiner |
| 10,102,543 | B2 * | 10/2018 | Holman ............. H04N 1/00244 |
| 10,129,253 | B2 | 11/2018 | Buscemi |
| 10,181,178 | B2 | 1/2019 | Cutler |
| 10,185,841 | B2 * | 1/2019 | Holman ................. G06V 20/20 |
| 10,223,576 | B2 | 3/2019 | Shuster |
| 10,229,312 | B2 * | 3/2019 | Barnett ................... G06T 11/00 |
| 10,242,282 | B2 | 3/2019 | Loce et al. |
| 10,289,863 | B2 | 5/2019 | Holman et al. |
| 10,313,638 | B1 | 6/2019 | Yeturu et al. |
| 10,346,624 | B2 * | 7/2019 | Holman ............. G06Q 50/184 |
| 10,387,675 | B2 | 8/2019 | Adams et al. |
| 10,395,056 | B2 * | 8/2019 | Li ........................ G06F 21/6245 |
| 10,491,558 | B2 | 11/2019 | Morrison et al. |
| 10,572,681 | B1 | 2/2020 | Murphy et al. |
| 10,586,070 | B2 | 3/2020 | Cai et al. |
| 10,628,922 | B2 | 4/2020 | Ra et al. |
| 10,657,361 | B2 | 5/2020 | Appleyard et al. |
| 10,761,343 | B2 | 9/2020 | Haseltine et al. |
| 10,834,290 | B2 * | 11/2020 | Holman ................. H04W 12/02 |
| 10,878,679 | B2 | 12/2020 | Russell |
| 10,885,606 | B2 | 1/2021 | Eswara |
| 10,915,660 | B2 | 2/2021 | Matusek et al. |
| 10,915,995 | B2 | 2/2021 | Moloney |
| 10,990,697 | B2 | 4/2021 | Murphy et al. |
| 11,049,349 | B2 | 6/2021 | Onischuk |
| 11,080,513 | B2 | 8/2021 | Shuster |
| 11,089,014 | B2 | 8/2021 | Buscemi |
| 11,115,627 | B1 | 9/2021 | Drako |
| 11,126,262 | B2 | 9/2021 | Von Und Zu Liechtenstein et al. |
| 11,144,659 | B2 * | 10/2021 | Grant .................. G06F 16/9535 |
| 11,176,357 | B2 | 11/2021 | Wang et al. |
| 11,270,407 | B2 | 3/2022 | Sano et al. |
| 11,282,174 | B1 | 3/2022 | Demaio |
| 11,328,095 | B2 | 5/2022 | Bates |
| 11,379,953 | B2 * | 7/2022 | Le Jouan .................. G06T 5/70 |
| 11,600,066 | B2 * | 3/2023 | Kondabathini ........ G06V 20/30 |
| 11,706,381 | B2 * | 7/2023 | Guzik .................... G06V 40/10 |
| | | | 382/103 |
| 11,743,064 | B2 * | 8/2023 | Cheung ................ G02B 27/017 |
| | | | 709/204 |
| 11,790,051 | B2 * | 10/2023 | Denton ................... H04L 63/08 |
| | | | 726/6 |
| 11,790,653 | B2 * | 10/2023 | Desai ............ H04N 21/234345 |
| | | | 345/419 |
| 11,800,201 | B2 * | 10/2023 | Chen ....................... G06F 16/78 |
| 12,021,844 | B2 * | 6/2024 | Courtwright ....... H04L 63/0421 |
| 2003/0231769 | A1 | 12/2003 | Bolle et al. |
| 2004/0208394 | A1 | 10/2004 | Kurata |
| 2006/0081706 | A1 | 4/2006 | Onischuk |
| 2006/0238380 | A1 | 10/2006 | Kimchi et al. |
| 2007/0153091 | A1 | 7/2007 | Watlington et al. |
| 2007/0192176 | A1 | 8/2007 | Onischuk |
| 2008/0180459 | A1 | 7/2008 | Jung et al. |
| 2008/0180538 | A1 | 7/2008 | Jung et al. |
| 2008/0297586 | A1 | 12/2008 | Kurtz et al. |
| 2009/0228348 | A1 | 9/2009 | Woolston et al. |
| 2009/0262987 | A1 * | 10/2009 | Ioffe ...................... G06T 11/10 |
| | | | 382/103 |
| 2010/0241493 | A1 | 9/2010 | Onischuk |
| 2011/0145150 | A1 | 6/2011 | Onischuk |
| 2013/0083155 | A1 | 4/2013 | Andresen |
| 2013/0085815 | A1 | 4/2013 | Onischuk |
| 2013/0305383 | A1 | 11/2013 | Garralda et al. |
| 2014/0025443 | A1 | 1/2014 | Onischuk |
| 2014/0086493 | A1 * | 3/2014 | Kothari ................. G06V 40/16 |
| | | | 382/195 |
| 2014/0231512 | A1 | 8/2014 | Onischuk |
| 2014/0365281 | A1 | 12/2014 | Onischuk |
| 2015/0012339 | A1 | 1/2015 | Onischuk |
| 2015/0104103 | A1 | 4/2015 | Candelore |
| 2015/0113664 | A1 | 4/2015 | Aad et al. |
| 2016/0132719 | A1 * | 5/2016 | Fithian .................. G06F 18/214 |
| | | | 345/647 |
| 2016/0171244 | A1 * | 6/2016 | Ur ........................ G06F 21/6254 |
| | | | 726/28 |
| 2016/0294781 | A1 | 10/2016 | Ninan et al. |
| 2016/0358013 | A1 | 12/2016 | Carter et al. |
| 2017/0091822 | A1 | 3/2017 | Tian et al. |
| 2017/0337652 | A1 * | 11/2017 | Sarin ................... H04N 1/4493 |
| 2017/0353423 | A1 | 12/2017 | Morrison et al. |
| 2018/0190032 | A1 * | 7/2018 | Barnett .................. G06Q 50/01 |
| 2018/0225477 | A1 | 8/2018 | Deluca et al. |
| 2019/0080098 | A1 | 3/2019 | Garralda et al. |
| 2019/0147185 | A1 * | 5/2019 | Cai ....................... G06V 40/173 |
| | | | 726/30 |
| 2019/0228182 | A1 | 7/2019 | Einecke et al. |
| 2020/0211162 | A1 | 7/2020 | Ra et al. |
| 2020/0372792 | A1 | 11/2020 | Li et al. |
| 2020/0386920 | A1 | 12/2020 | Pham et al. |
| 2021/0084194 | A1 | 3/2021 | Rakshit et al. |
| 2021/0303851 | A1 | 9/2021 | Dodson et al. |
| 2021/0374659 | A1 | 12/2021 | Ganapathi et al. |
| 2021/0388671 | A1 | 12/2021 | Kirkeby et al. |
| 2022/0012359 | A1 | 1/2022 | Burceanu et al. |
| 2022/0012366 | A1 | 1/2022 | Burceanu et al. |
| 2022/0012471 | A1 | 1/2022 | Yuan et al. |
| 2022/0109670 | A1 | 4/2022 | Buscemi |
| 2022/0159175 | A1 | 5/2022 | Vemury |
| 2022/0159176 | A1 | 5/2022 | Vemury |
| 2022/0188973 | A1 | 6/2022 | Puttagunta |

\* cited by examiner

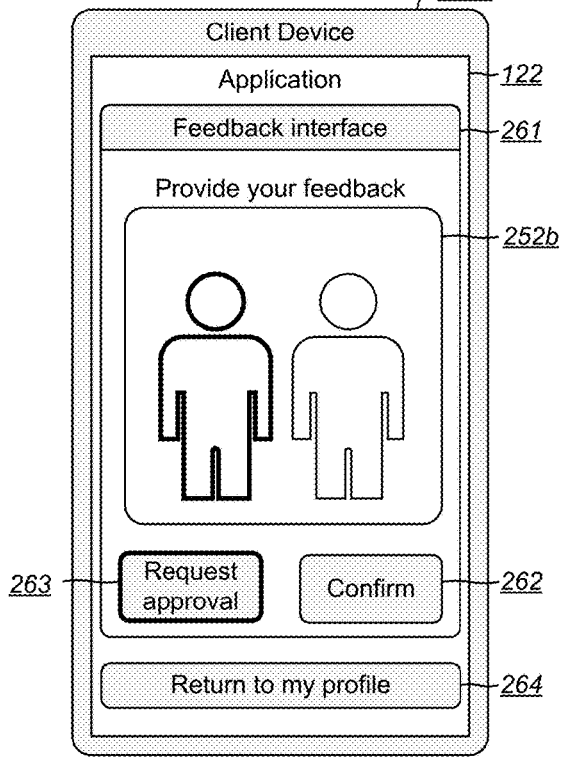
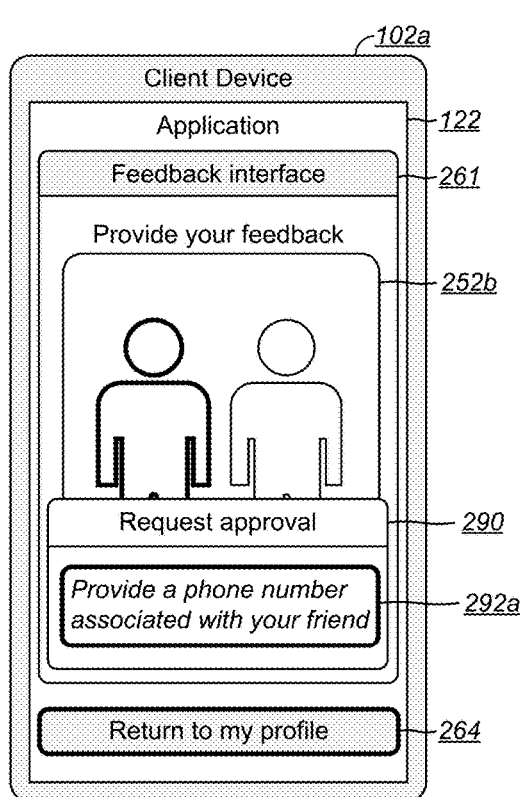
FIG. 2G                                    FIG. 2H

PRIVACY PROTECTION OF DIGITAL IMAGE DATA ON A SOCIAL NETWORK

CROSS-REFERENCE TO RELATED APPLICATION

This application claims the benefit of U.S. Provisional Application No. 63/413,505 filed on Oct. 5, 2022, and titled "Privacy Protection of Digital Image Data on A Social Network," which is incorporated here by reference in its entirety.

TECHNICAL FIELD

This specification generally relates to networking applications, and more specifically, social networking applications deployed in computer networks.

BACKGROUND

The present disclosure relates to computer-implemented methods, systems, and apparatuses for protecting privacy of digital image data on, for example, a social network application.

Social network applications, such as dating applications, provide functionality for users to communicate with other users using their mobile devices. One way a social network application allows users to communicate with other users is via digital image data users have shared on the social network application. Based on the digital image data, users express their interests in communicating with one another electronically using the social network application.

SUMMARY

This specification describes techniques for protecting privacy of digital image data, e.g., pictures and videos, on a social network application.

Embodiments can include one or any combination of two or more of the following features.

In an aspect, a computer-implemented method includes obtaining, from a first client device associated with a first user, digital image data. The first user is one of a plurality of users of a social network. The computer-implemented method includes determining that the digital image data includes an image of multiple unique faces; applying, to the digital image data, a machine learning model configured to identify, among the multiple unique faces, a face of the first user; and obscuring, in the digital image data and based on a user preference specifying a mode of obscuring, the multiple unique faces except the face of the first user. The computer-implemented method includes storing the digital image data having the obscured faces in a database; and associating the stored digital image data with a profile associated with the first user in the social network.

Other embodiments of these and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the digital image data include (i) one or more pictures, (ii) one or more videos, or both.

In some implementations, the method includes providing, to the first client device and at least some of a plurality of client devices associated with users of the social network, the digital image data.

In some implementations, the method includes obtaining, from the first client device, a plurality of digital image data that include an image of the face of the first user; and training, based on the plurality of digital image data, the machine learning model configured to extract features representative of the face of the first user.

In some implementations, the method includes prompting the first user to take a live selfie; and verifying an identity of the first user based on the live selfie.

In some implementations, the method includes: in response to obtaining, from the first client device, feedback data specifying additional faces to be obscured, obscuring the additional faces in the digital image data.

In some implementations, the mode of obscuring includes one or more of (i) blurring a face in the digital image data and (ii) overlaying a visual representation on pixels indicative of the face in the digital image data.

In some implementations, the visual representation includes one or more of an emoji and a face of the first user.

In some implementations, the method includes obtaining, from a second client device associated with a second user, a privacy preference specifying approval to display a face of the second user in the digital image data associated with the profile of the first user; and obscuring the multiple unique faces in the digital image data except the face of the first user and the face of the second user.

In some implementations, the users of the social network are users matched to the first user on the social network.

In some implementations, each of the digital image data is accompanied with a text caption.

In some implementations, the method includes: determining that the first user violates a privacy requirement of the social network; and presenting, to the first client device, a warning indication.

In some implementations, determining that the first user violates the privacy requirement of the social network includes: obtaining an indication, from a third client device associated with a third user matched to the first user, that at least one of the digital image data in the profile associated with the first user includes a second face other than the face of the first user; and determining that the second face does not belong to users who approved usage of their faces to the first user.

In some implementations, the method includes: applying, to the digital image data, a second machine learning model configured to identify a portion of the digital image data that do not meet one or more safety criteria; and obscuring, in the digital image data, the portion of the digital image data.

In some implementations, the portion of the digital image data that do not meet the safety criteria includes age-inappropriate contents.

Embodiments of the subject matter described in this specification can be implemented so as to realize one or more of the following advantages. The approaches described here solve a technical problem of protecting privacy of digital image data on a social network. As users of the social network share digital images that can include other individuals, privacy of these individuals can be invaded. Because of a wealth of digital image data on the social network, protecting privacy of the digital image data in a computationally efficient manner is essential to solve this technical problem. The approaches described here utilizes a machine learning model to identify a face of a user, at a near real-time, and obscures other faces for privacy protection.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A-2I, 3A-3E, 4, and 5 illustrate example user interfaces.

Like reference numbers and designations in the various drawings indicate like elements.

DETAILED DESCRIPTION

The present disclosure relates to approaches to protecting privacy of digital image data on a social network, e.g., a social network application in the context of dating, professional recruiting or networking, interest-based discussion, or other suitable context. The social network application identifies potential matches between a particular user of the social network application (referred to as the requesting user) and one or more other users of the social network application. Profiles for those potential matches are presented to the requesting user. Each profile includes digital image data (e.g., pictures and videos) that include images of a user associated with the profile. The digital image data in the profile may include images of individuals, who may be users of the social network application, other than the user associated with the profile. Privacy of these individuals is protected by obscuring a portion, e.g., faces of the individuals, of the digital image data.

Figure 1:
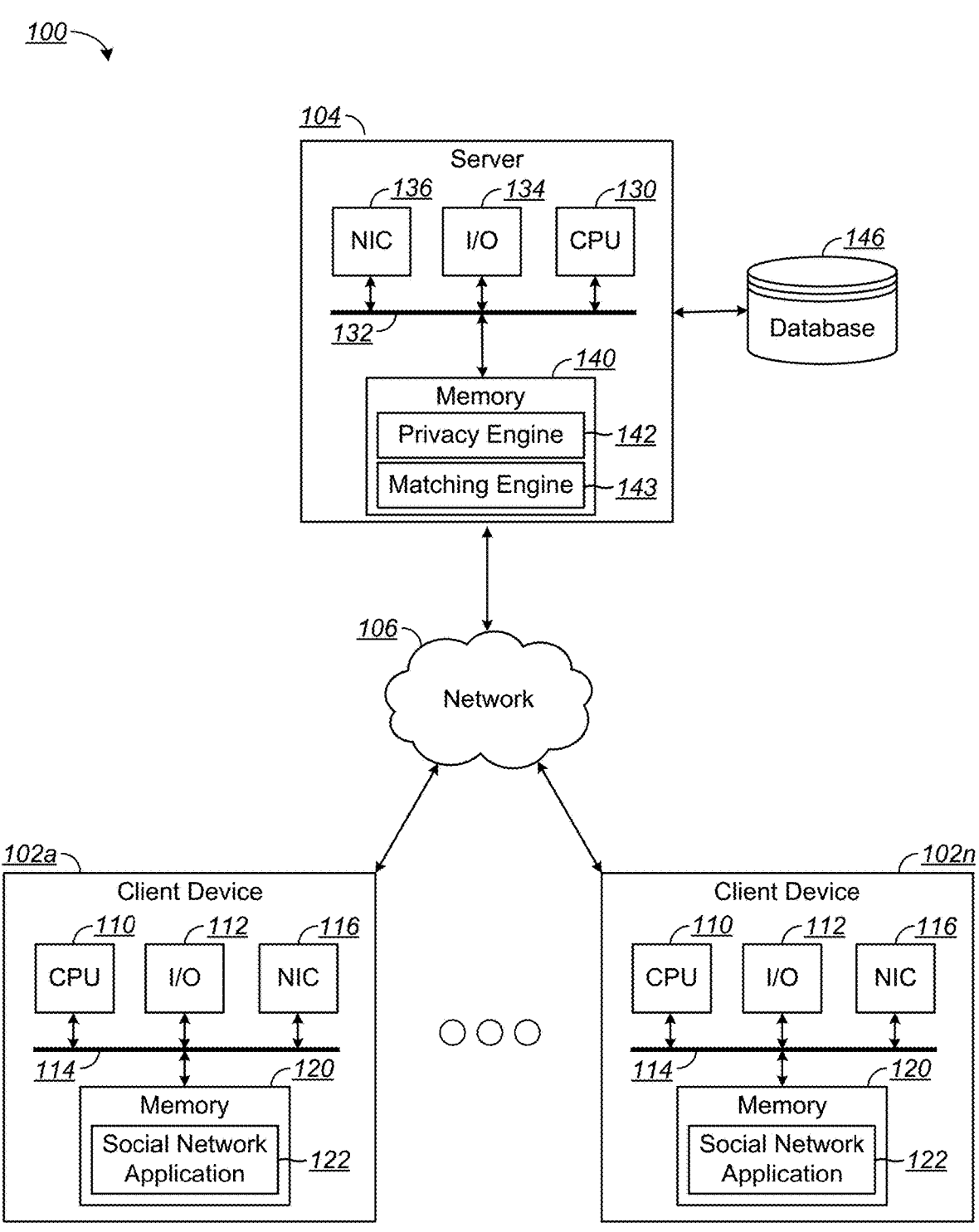
FIG. 1 illustrates an example of a social network system.

FIG. 1 illustrates an example of a social network system 100. The system 100 includes a plurality of client devices 102a through 102n in communication with a server 104 via a network 106, which may be a wired or wireless network or any combination thereof. Each client device 102a through 102n (referred to collectively as client devices 102) includes a processor (e.g., central processing unit) 110 in communication with input/output devices 112 via a bus 114. The input/output devices 112 can include a touch display, keyboard, mouse, and the like. A network interface circuit 116 is also connected to the bus 114 to provide wired and/or wireless connectivity to the network 106. A memory or other storage medium 120 is also connected to the bus 114. The memory 120 stores instructions executed by the processor 110. In particular, the memory 120 stores instructions for a social network application 122, such as a dating application, which communicates with the server 104 to coordinate introductions between users that have been identified as potential matches (e.g., potentials friends, dating partners, business partners, etc.). In some implementations, each client device 102 is a mobile device (e.g., smartphone, laptop, tablet, wearable device, etc.) executing the social network application 122. Different client devices 102 are operated by different users that subscribe to the same social network application 122.

The server 104 includes a processor 130, bus 132, input/output devices 134 and a network interface circuit 136 to provide connectivity to the network 106. A memory 140 is connected to the bus 132. The memory 140 stores a privacy engine 142 and a matching engine 143 with instructions executed by the processor 130 to implement operations disclosed in connection with FIGS. 2 through 6. The privacy engine 142 can verify a profile of the user, e.g., by verifying the user's identity and apply an image obscuring algorithm to digital image data on the user's profile, among other features. The matching engine 143 applies matching criteria to a profile of a given user and profiles for respective other users of the social network application 122 to identify potential matches. The matching engine 143 can include a machine learning model trained to identify features from the interests of a user, and the machine learning model can process profile information for other users to identify potential matches for the user. The database 146 in communication the server 104 stores information for use by the social network application 122, the privacy engine 142, and the matching engine 143. The database 146 can include user profile information (e.g., a user's images), match information, message information, or other information.

Figure 2A:
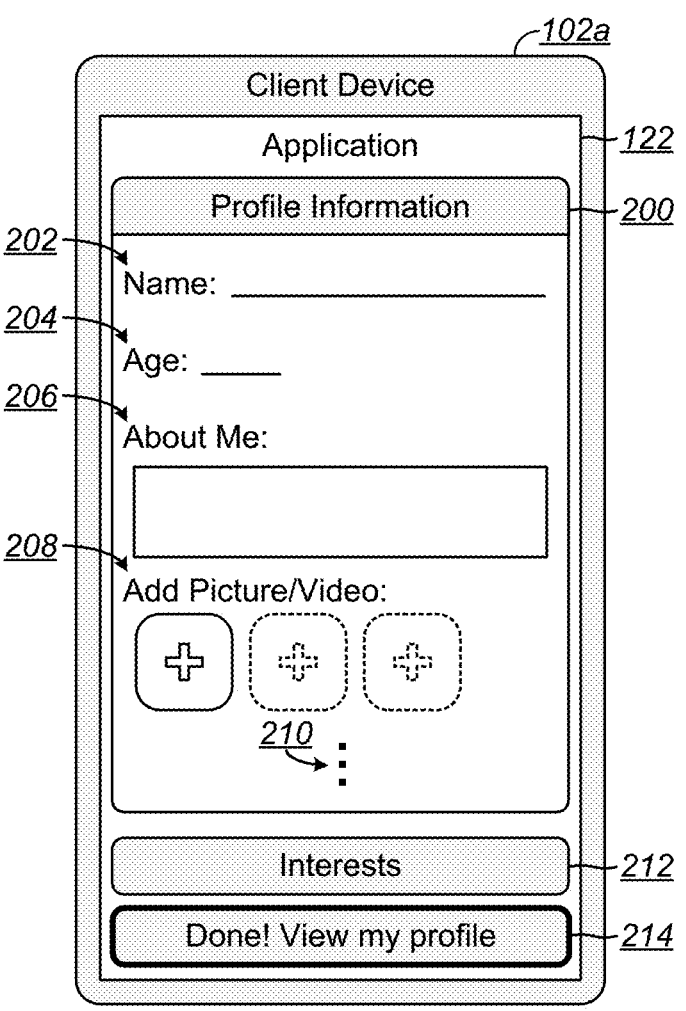

Referring to FIG. 2A, a user of a client device 102 can create a profile to participate in the social network application 122. For example, a user of a client device 102a can create a profile by interacting with a user interface to provide profile information 200, such as name 202, age 204, biographical text 206, pictures and/or videos 208, and a range of other fields 210 (e.g., geographical information, links to social media profiles on other networks, etc.) that allow the user to characterize himself or herself. Each user can specify their interests 212, such as hobbies, distance, age, commitment disposition, or combinations of them, for use in identifying potential matches. The matching engine 143 can use the interests 212 to generate matching criteria for use in identifying potential matches for the user.

Figure 2B:
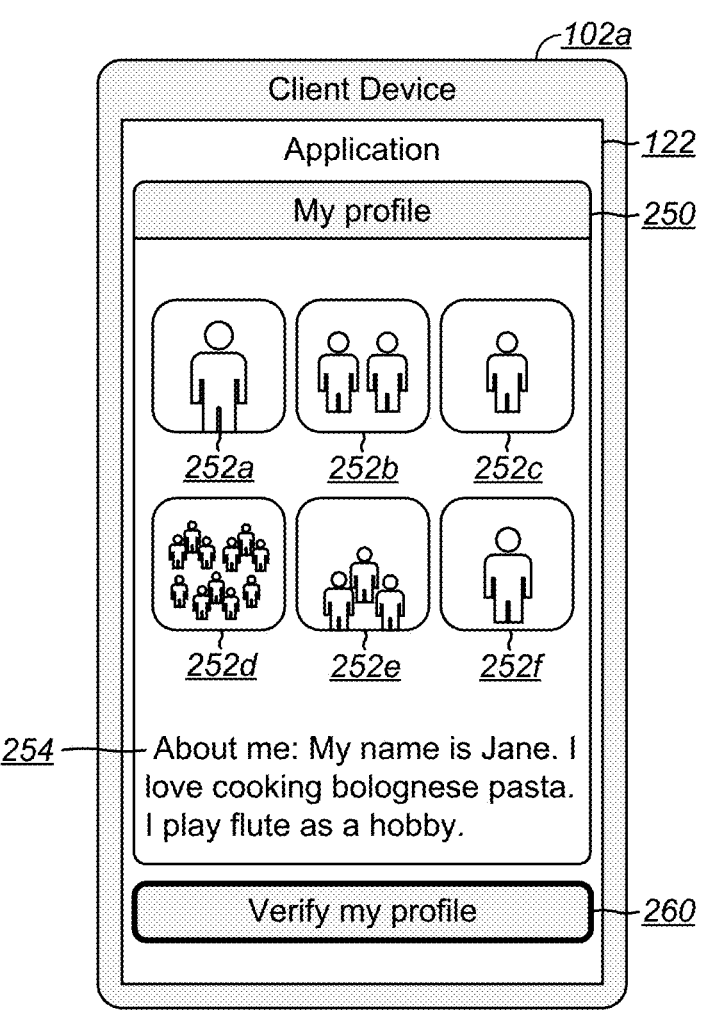

Each user can view their profile by interacting with a selectable element 214. In response to the selection of the selectable element 214, the system displays the user's profile on a user interface 250 as shown in FIG. 2B. For example, FIG. 2B illustrates Jane's profile displayed on user interface 250. The user's profile includes digital images, e.g., images 252a-252f, and a biographical text 254. For example, images 252a, 252c, and 252f are Jane's images herself, while images 252b, 252d, and 252e are group images including not only Jane, but also other individuals. In some implementations, one or more of the images is accompanied with a text caption.

Figure 2C:
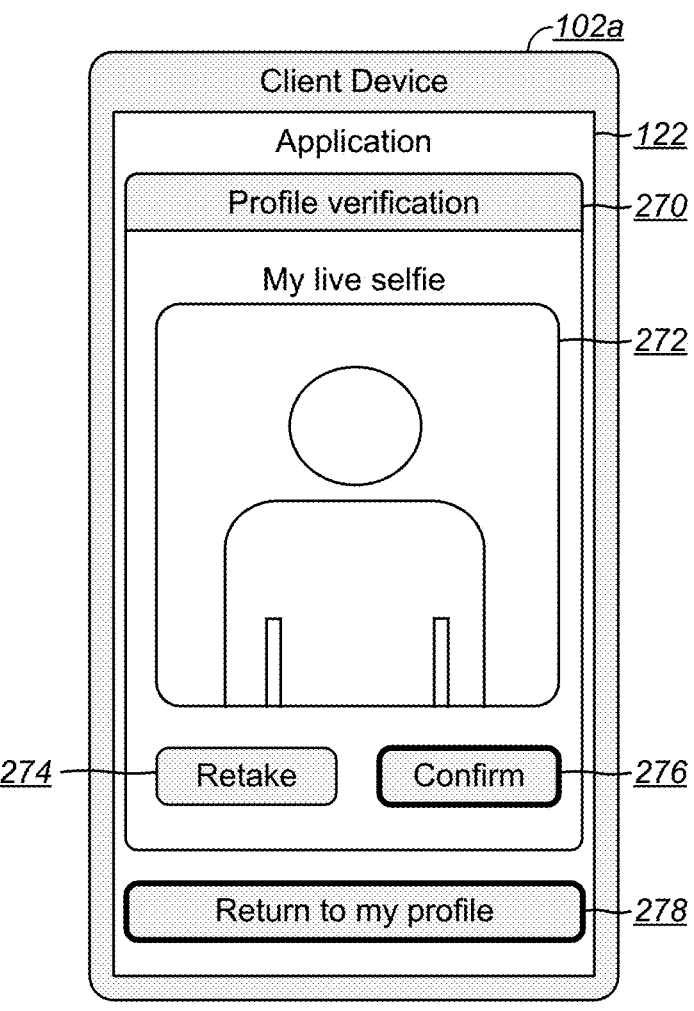

FIG. 2C illustrates an example of a profile verification interface 270 in response to a user selection of a 'verify my profile' selectable element 260. The selection can be made by tapping, swiping, dragging, or selecting the selectable element. The profile verification interface 270 prompts the user to take a live selfie. In some implementations, the application 122 obtains a permission from the client device to access a camera from the client device and takes a live selfie of the user. The profile verification interface 270 displays the live selfie 272. A user can either retake by selecting a 'retake' selectable element 274 or confirm by selecting a 'confirm' selectable element 276. In some implementations, the profile verification interface 270 prompts the user to take multiple live selfies. In some implementations, the profile verification interface 270 prompts the user to take a video of himself or herself, instead of or in addition to pictures. A selectable element 278 ('Return to my profile') causes the user interface to display the user's profile.

Figure 2D:
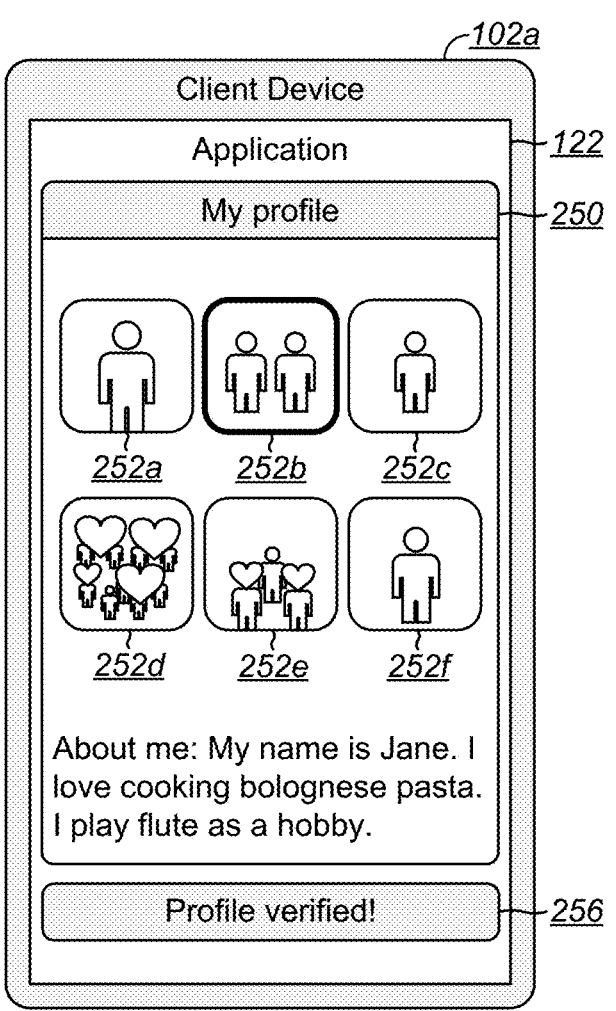

FIG. 2D illustrates an example of the user interface 250 after applying privacy protection on digital image data. For example, the system, e.g., the privacy engine 142, determines that the images 252*d* and 252*e* are images including multiple unique faces. The system applies a machine learning model configured to identify a face of the first user, e.g., based on the live selfie 272 taken during the profile verification. The system obscures the multiple unique faces except the face of the first user, e.g., by overlaying a visual representation (e.g., a heart emoji, another shape, or a general blurring) on pixels indicative of faces of individuals other than the first user. The system stores the digital image data having the obscured faces in a database, e.g., the database 146, and associates the stored digital image data with a profile associated with the first user. As shown in FIG. 2D, the digital image data after applying the privacy protection are presented on the user interface 250. The application 122 also indicates that the profile is verified, via a message 256 ("Profile verified!").

The machine learning model can perform one or more of the following features: (i) a face detection, (ii) a face alignment, (iii) a feature extraction, and (iv) a face recognition. Based on identifying faces in a particular image, the system determines if the image is a group image including multiple unique faces. In some implementations, during training, the system performs a face alignment, e.g., resizing and straightening images, to improve accuracy of the face recognition. The machine learning model learns facial features that can be used to recognize a face by using training image data including a face of the user. Upon training, the machine learning model makes a comparison on facial features extracted from faces recognized from an image vs. the facial feature of a user learned during training, which can be saved in the database 146. In response to determining that facial features match, the machine learning model outputs pixels indicative of the face of the user in the image. In some implementations, the machine learning model uses a deep learning architecture including convolutional layers, fully connected layers, and output layers.

In some implementations, the machine learning model can perform analogous features for a body, e.g., a body detection, a body alignment, a body extraction, and a body recognition. For example, the machine learning model can determine how many bodies appear in the digital image data and identify a portion of the digital image data that are predicted to include inappropriate contents, e.g., a naked body or an offensive body gesture. The identification is based on one or more safety criteria, which can include various conditions (e.g., a naked body) causing obscuring. The system obscures the portion of the digital image data.

Figures 2E, 2F:
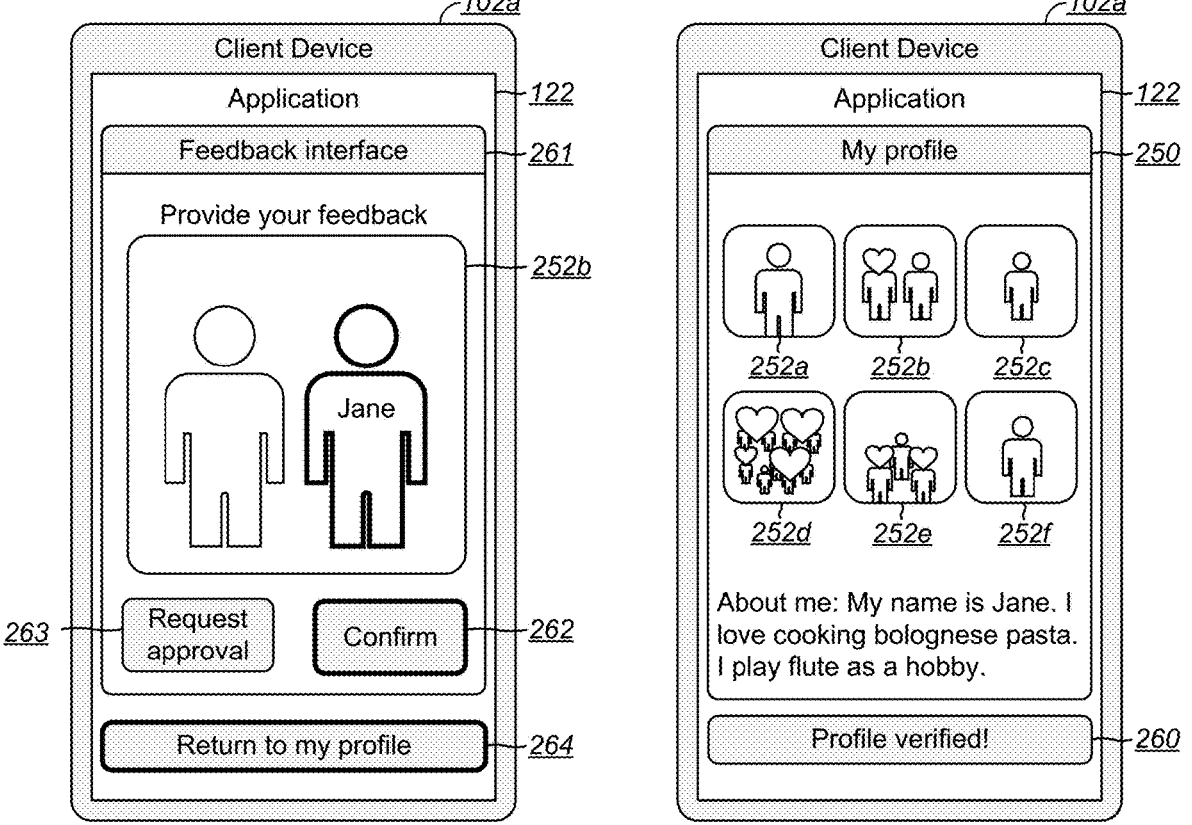

In some implementations, the system obtains feedback data specifying additional faces and/or bodies to be obscured. For example, referring to FIG. 2D, the user selects the image 252*b*, e.g., by tapping or clicking the image 252*b*. FIG. 2E illustrates an example feedback interface 261. The feedback interface 261 presents the selected image 252*b* and prompts the user to identify himself or herself in the image. For example, Jane identifies herself in the image 252*b* by annotating a portion of the image 252*b* corresponding to herself. In some implementations, the system displays the annotation on the feedback interface. A user can confirm the feedback by selecting a 'confirm' selectable element 262 and return to the profile by selecting a selectable element 264 ('Return to my profile'). FIG. 2F illustrates the user interface

250 after incorporating the feedback by the user. For example, the system obscures another individual, by placing a heart emoji on their face, in the image 252*b*.

A user can request approval from other users for displaying their faces in the user's profile. Referring to FIG. 2G, on the feedback interface, the user can select an individual the user is seeking approval from (e.g., by annotating the individual from the image 252*b*) and selects a 'request approval' selectable element 263. The feedback interface 261, in response to the user selection of the 'request approval' selectable element 263, presents a request approval interface 290. The request approval interface 290 presents a box 292*a*, where the user can provide a phone number associated with the individual the user is seeking approval from. In response to the user's submission of the approval request, the individual gets notified and can provide approval, e.g., by responding to a text message sent by the application 122. In some implementations, the individual is also a user of the social network application and can approve on the application 122. The user can select the selectable element 264 to return back to the profile.

Figure 2I:
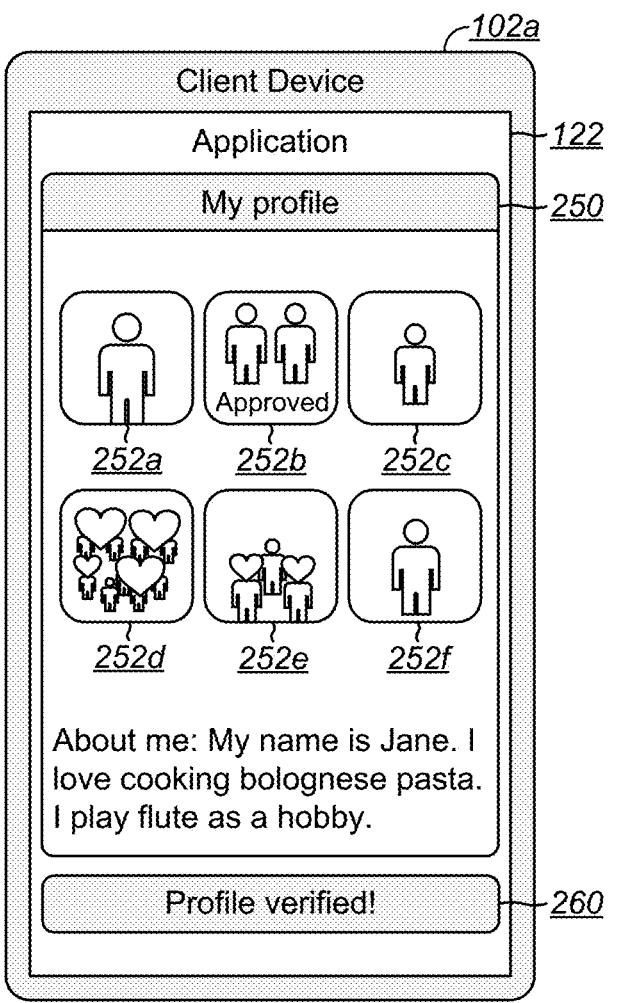

FIG. 2I illustrates the user interface 250 after applying privacy protection on digital image data and incorporating the approval on the image 252*b*. For example, the user interface 250 does not obscure the individual's face in the image 252*b* and indicates that the image 252*b* is approved. In some implementations, users matched with Jane can also see the approval indication on the image 252*b*.

Figure 3A:
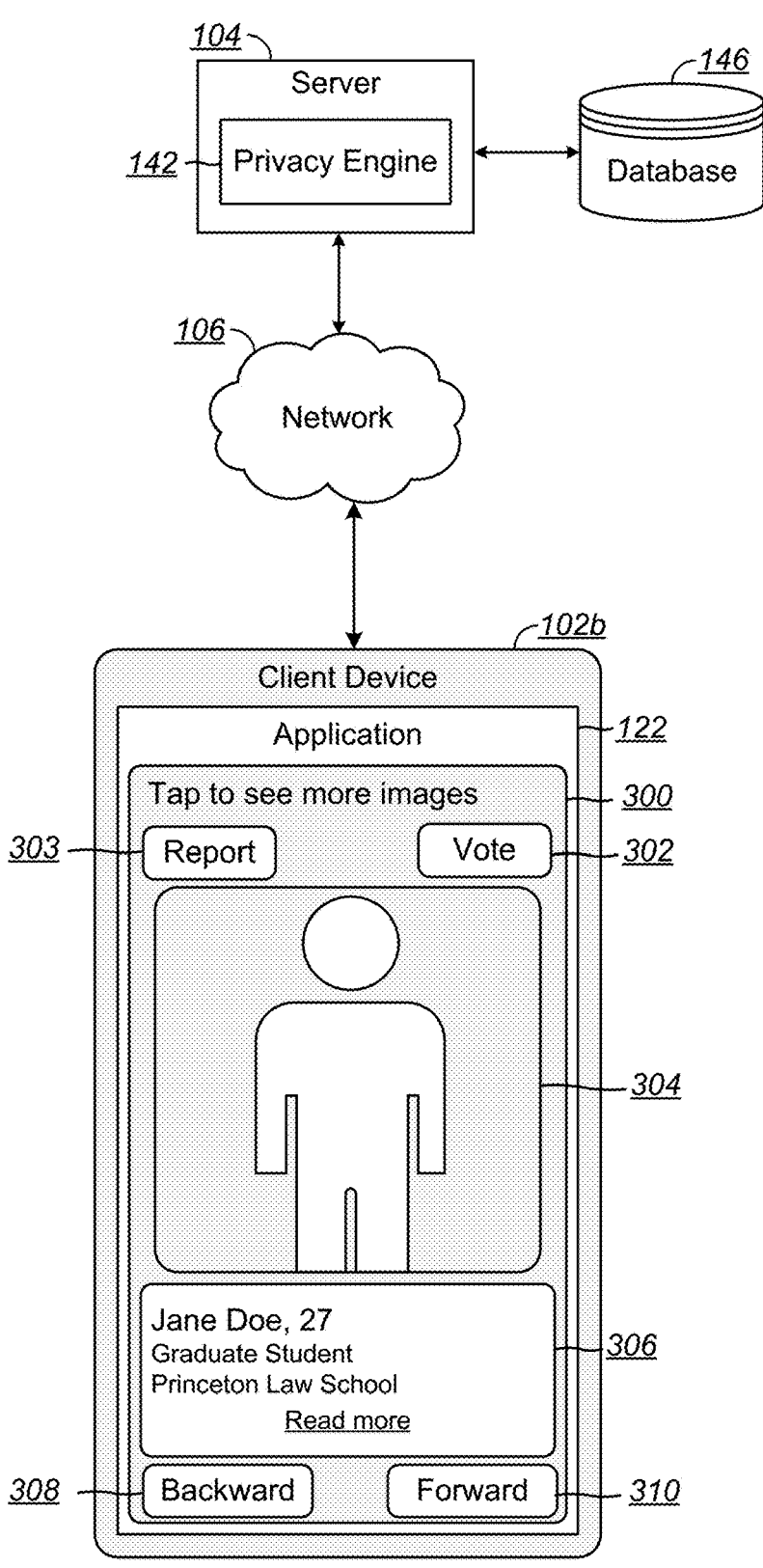

FIG. 3A illustrates an example of a user interface 300 executed on the application 122 on a client device 102*b*. As an example, the client device 102*b* is associated with John, another user on the social network. The system identifies a set of profiles as potential matches for a user and presents one profile at a time, e.g., in a random order or by a rank indicative of a relative similarity between two profiles. For example, after determining potential matches between Jane and John, e.g., based on their interests, the user interface 300 presents Jane Doe's profile, including an image 304 and a biographical information 306, to John. John can vote to match with Jane by interacting with a 'vote' selectable element 302. In some implementations, a user can vote to match with the user associated with the displayed profile by swiping off the screen in a certain direction (e.g., right to vote 'yes'; left to vote 'no'; up to 'skip/defer'). A user can navigate across the set of profiles by interacting with a 'backward' selectable element 308 or a 'forward' selectable element 310. A user can see more images of the displayed profile, e.g., by tapping on the user interface 300.

Figure 3B:
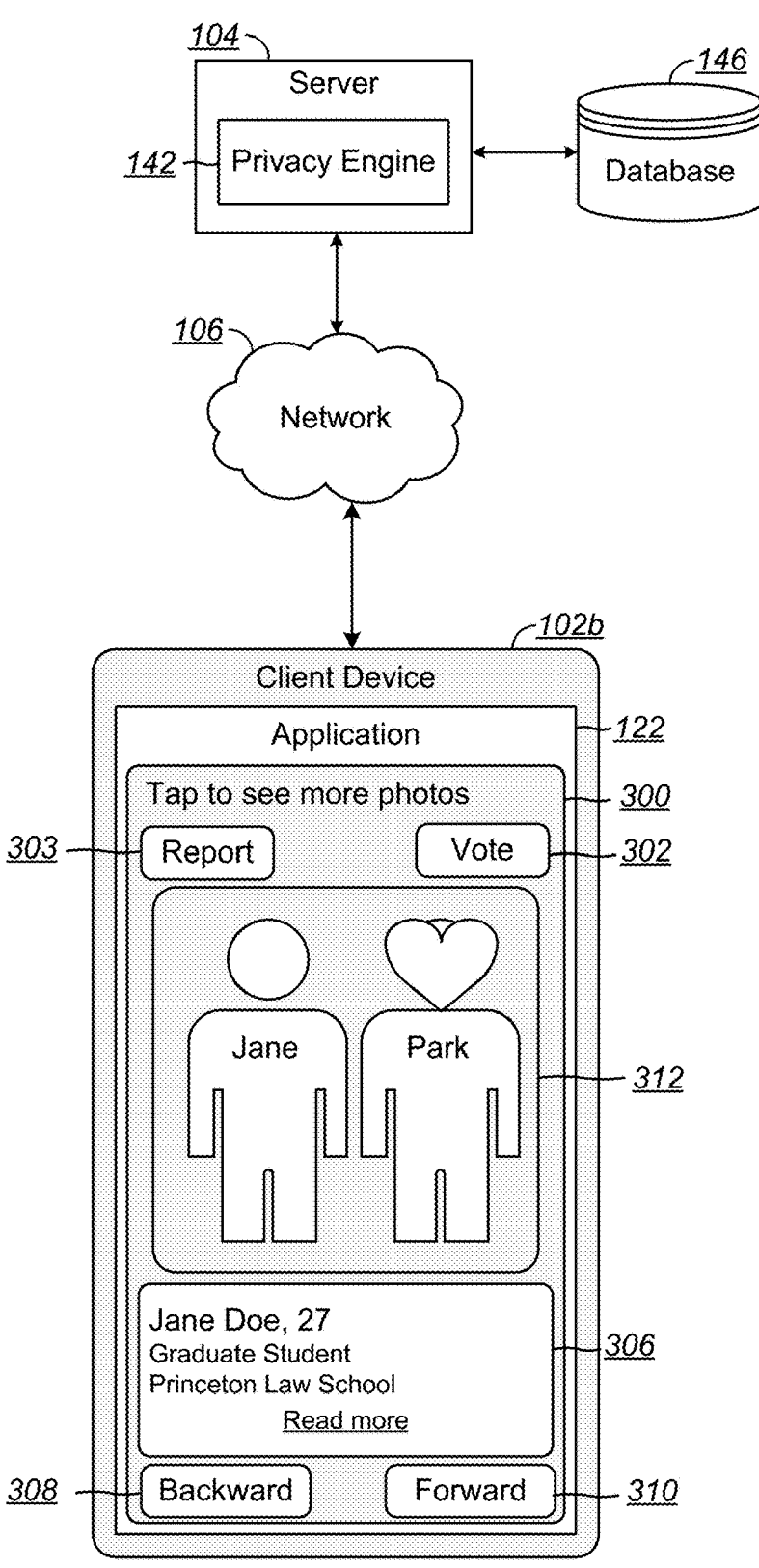
Figure 3C:
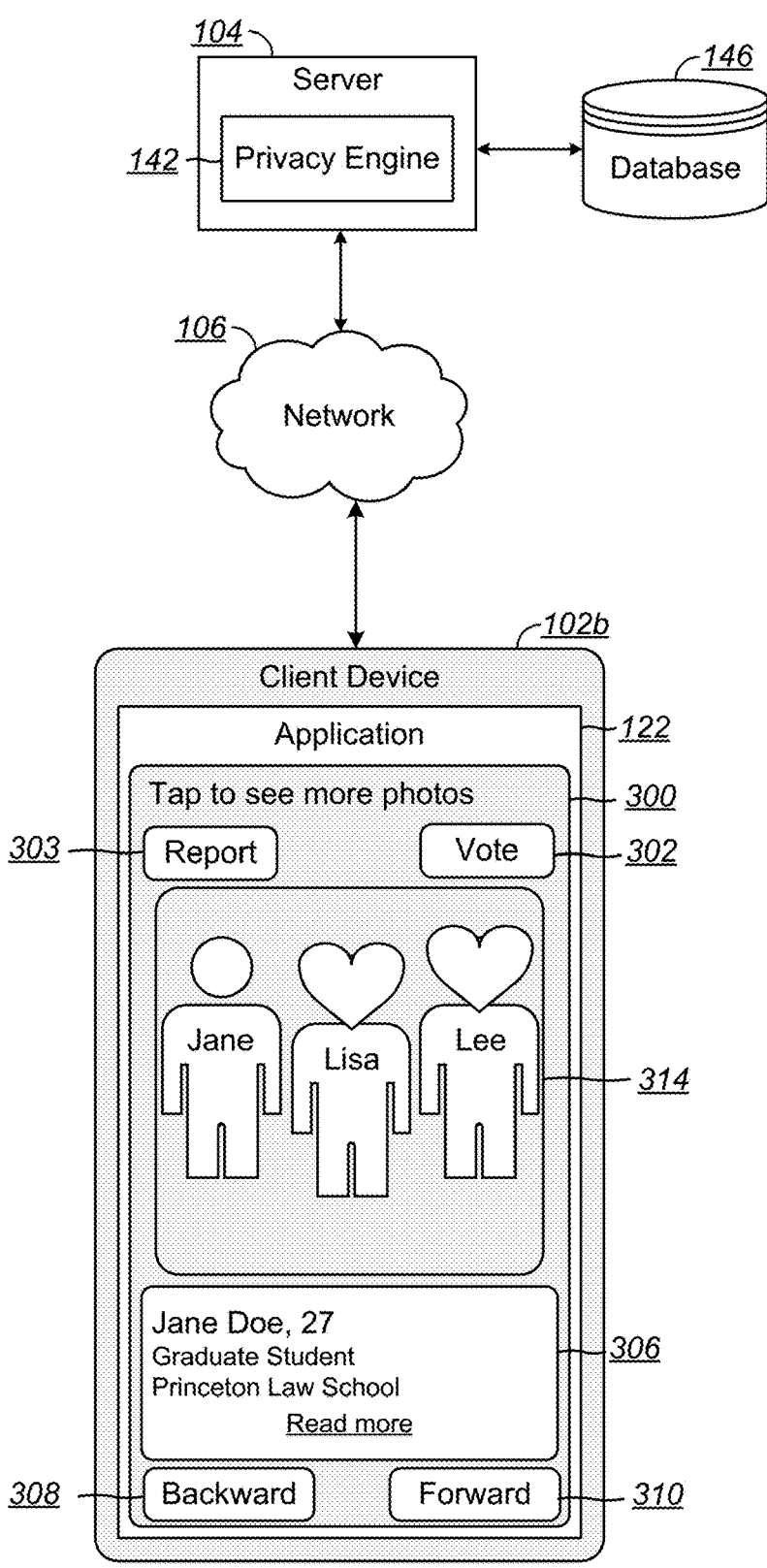

FIG. 3B illustrates the user interface 300, in response to the user's request to see more photos. For example, the user interface 300 displays an image 312 that includes both Jane and Park, but with Park's face obscured on the image 312. Similarly, FIG. 3C shows an image 314 that includes Jane, Lisa, and Lee, but both Lisa's and Lee's faces obscured on the image 314. In some implementations, the system blurs faces as a mode of obscuring. In some implementations, the system overlays a visual representation such as an emoji as a mode of obscuring. In some implementations, a user can select the mode of obscuring, e.g., by customizing which visual representation to use for overlaying.

Figure 3D:
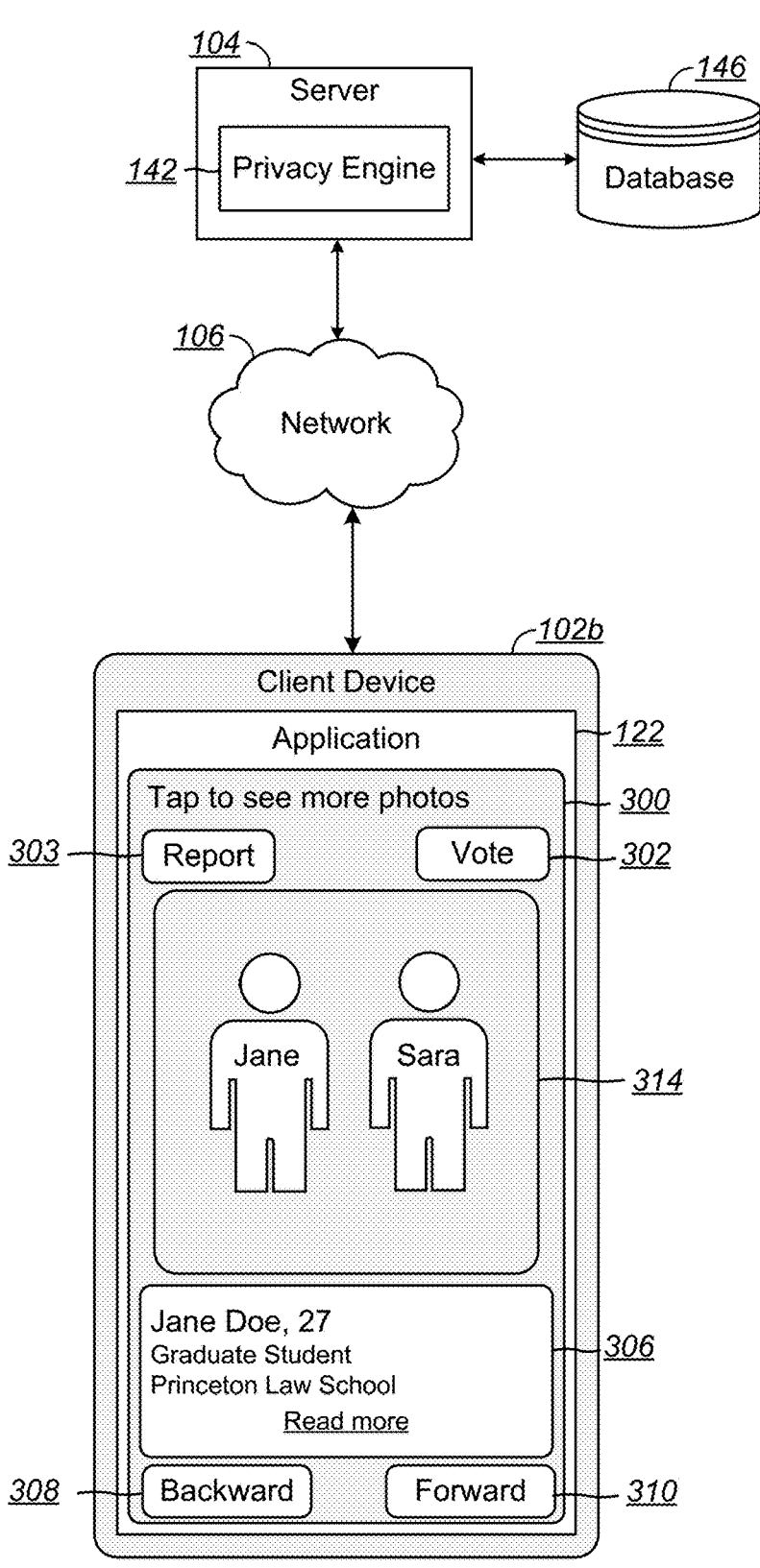
Figure 3E:
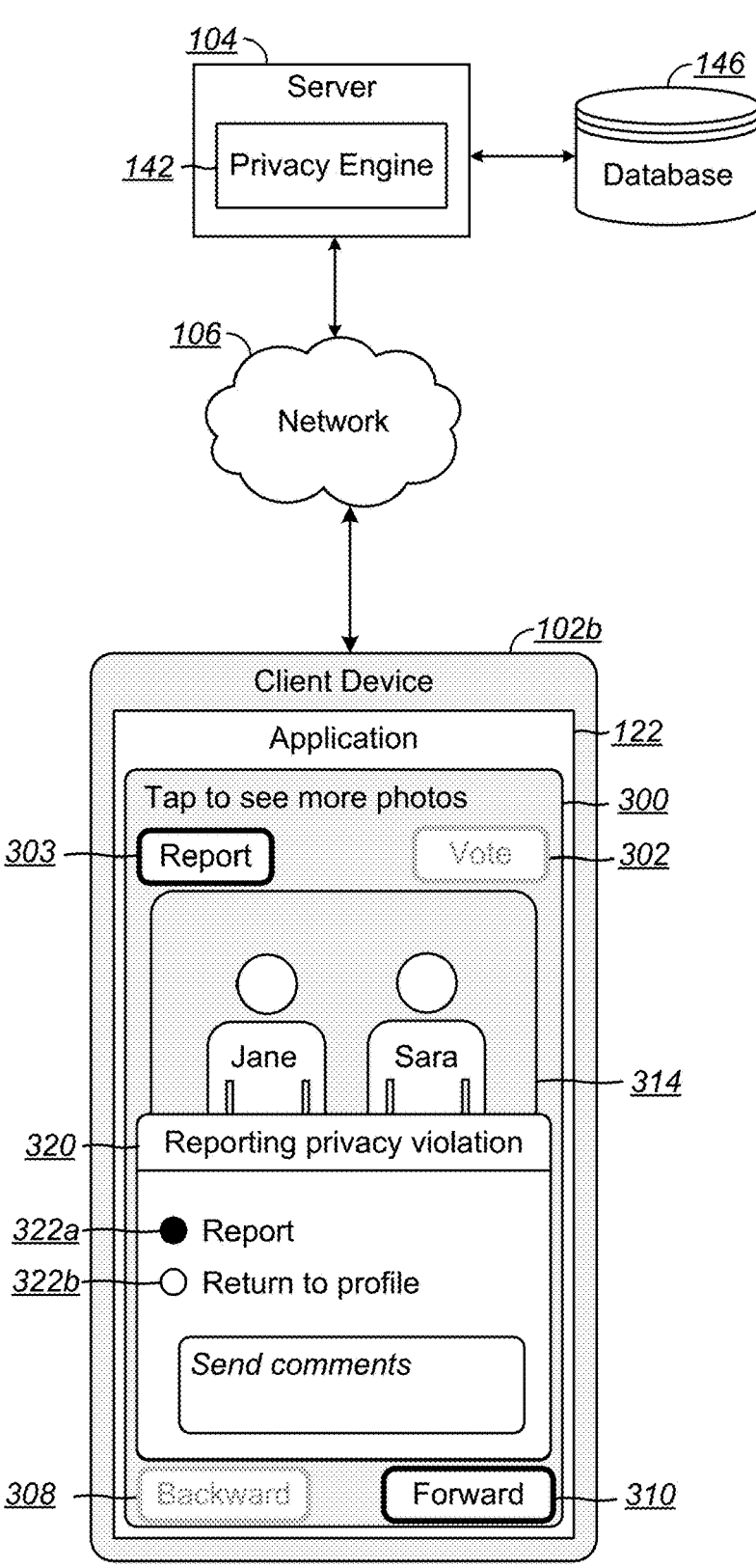

Referring to FIG. 3D, a user can report a violation of a privacy requirement of the social network application by selecting a 'report' selectable element 303. For example, an image 314 from Jane's profile includes Sara's unobscured face. In response to John's selection of the 'report' selectable element 303, the user interface 300 provides an interface 320 that includes an option to 'report' 322*a*, an option to 'return to profile' 322*b*, and a message box for comments. In the example of FIG. 3E, the options are presented as radio buttons.

Figure 4:
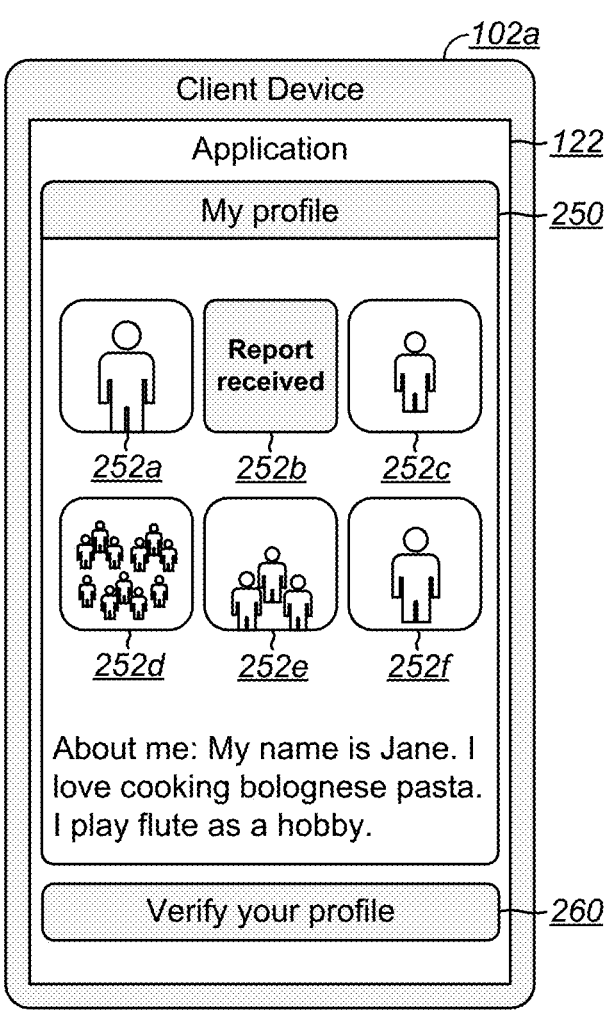

FIG. 4 illustrates a warning indication on the user interface 250, in response to the report received. In some implementations, the user can dispute the report by providing information that the report was made in error or by obtaining approval from individual(s) in the image associated with the report. In the example of FIG. 4, the system removes the image 252*b* and displays the warning indication 'report received'. In some implementations, the system manually checks if the report is valid. In some implementations, the system removes the image associated with the report after receiving same reports exceeding a pre-defined threshold number of times from multiple users.

Figure 5:
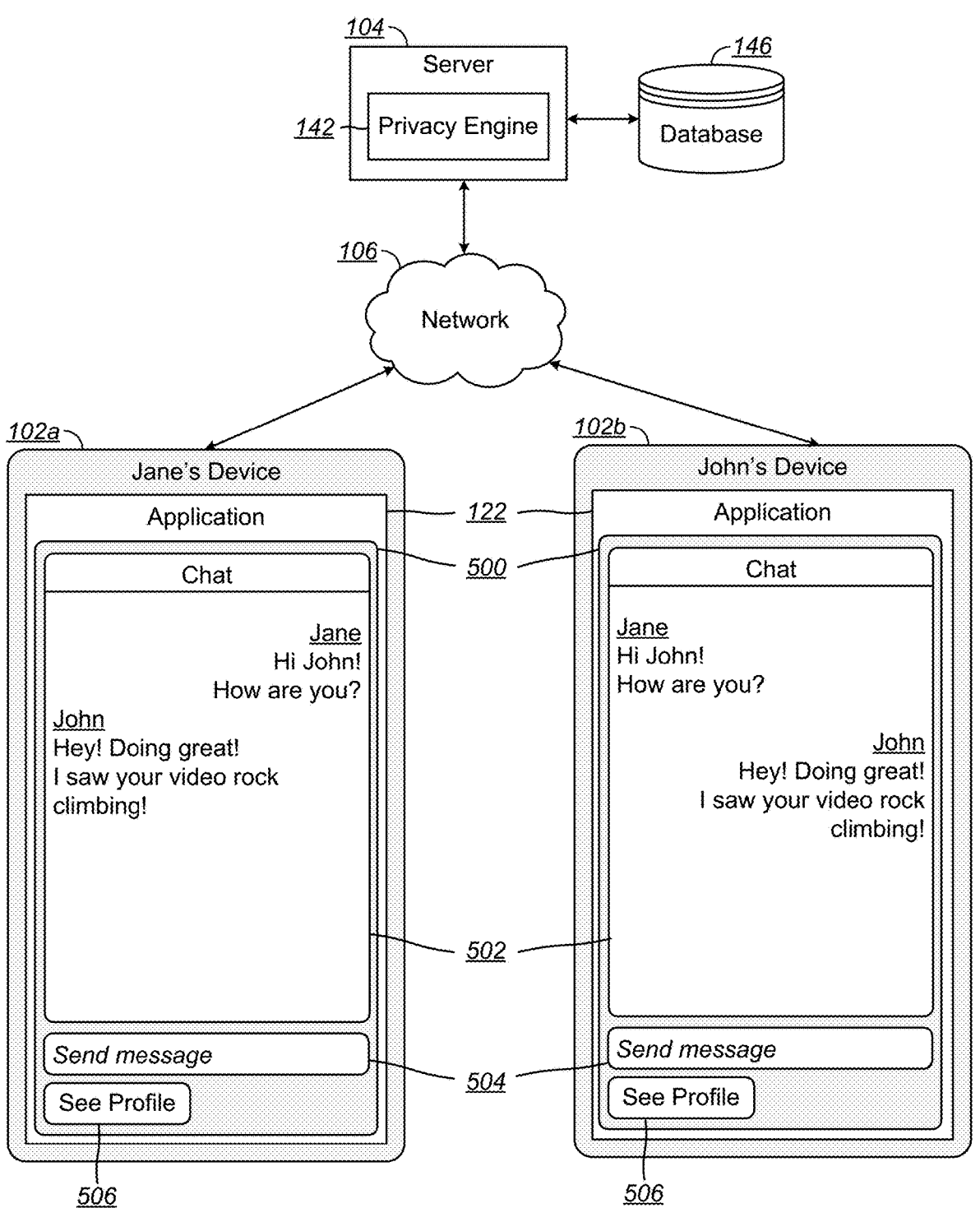

FIG. 5 illustrates an example one-to-one communication interface 500 between matched users, e.g., Jane using a client device 102*a* and John using a client device 102*b*. Jane and John have been matched based on their mutual votes to be matched to each other. After determining their mutual votes, the system 100 enables the one-to-one communication between matched users by transmitting audio or/and video data from the client devices 102*a*-102*b* to the server and transmitting the data to the matched user. The one-to-one communication interface 500 can include message data, e.g., via a chat window 502 where the matched users can send messages using a message box 504. The system 100 can provide a feature that allows matched users to see each other's profile via a profile selectable element 505. The application 122 can present the matched user's profile information through the user interface, in response to the user's selection of the profile selectable element 505. As described above referring to FIG. 2A, the profile information includes name, age, biographical text, images and/or videos, and a range of other fields.

Figure 6:
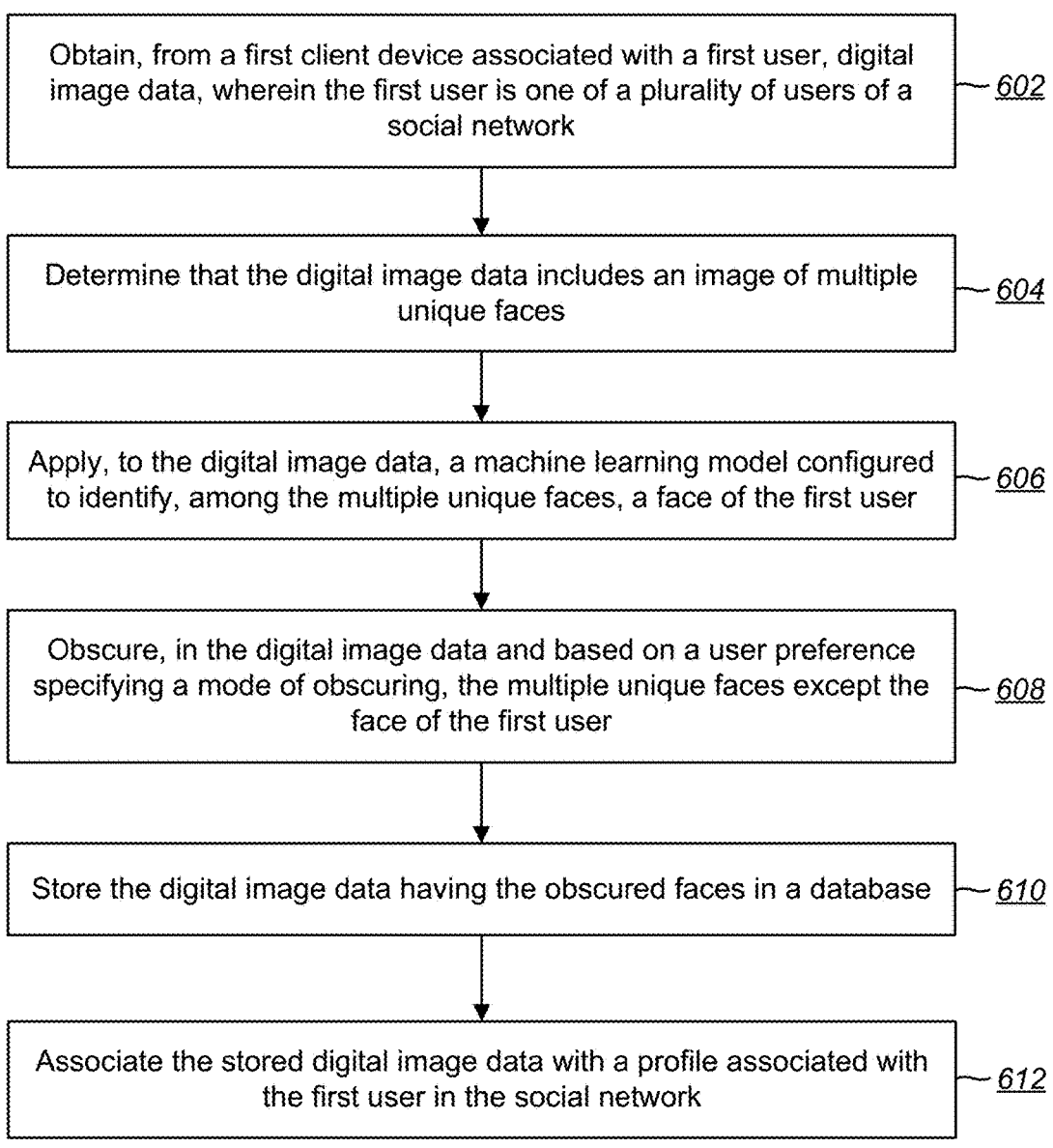
FIG. 6 illustrates a flowchart of an example process for protecting privacy of digital image data on a social network application.

FIG. 6 is a flowchart of an example process 600 for protecting privacy of digital image data on a social network application. The process will be described as being performed by a system of one or more computers programmed appropriately in accordance with this specification. For example, the privacy engine 142 from the system 100 of FIG. 1 can perform at least a portion of the example process. In some implementations, various steps of the process 600 can be run in parallel, in combination, in loops, or in any order.

The system obtains, from a first client device associated with a first user, digital image data (602). The first user is one of a plurality of users of a social network. The first user can add the digital image data to their profile, as shown in FIG. 2A. The digital image data includes (i) one or more pictures, (ii) one or more videos, or both. In some implementations, the system provides the digital image data to the first client device and at least some of a plurality of client devices associated with users of the social network, e.g., those matched to the first user. In some implementations, the digital image data is accompanied with a text caption.

The system determines that the digital image data includes an image of multiple unique faces (604). In response to determining that the image includes a face of the user himself or herself, the system does not apply an obscuring algorithm to save computational resources. In some implementations, the system utilizes a machine learning model to determine how many unique faces are present in the image.

The system applies, to the digital image data, a machine learning model configured to identify, among the multiple unique faces, a face of the first user (606). The machine learning model is trained using a plurality of digital image data that include an image of the face of the first user. For example, the system obtains the plurality of digital image data that include an image of the face of the first user and process the plurality of digital image data to multiple layers of neural networks. The machine learning model aims to extract face characteristics so that it can be used to distinguish the face of the first user from other faces.

In some implementations, the system prompts the first user to take a live selfie and verifies an identity of the first user based on the live selfie. The live selfie can be used to train the machine learning model. The system can identify digital image data that do not include the first user and presents a warning indication to the first client device. In some implementations, the system removes the digital image data that do not include the first user without the consent of the first user. If the identity of the first user is not verified, e.g., through a live selfie, the system can indicate, to users matched to the first user, a warning indication that the first user's identity has not been verified.

The system obscures, in the digital image data and based on a user preference specifying a mode of obscuring, the multiple unique faces except the face of the first user (608). The mode of obscuring includes one or more of (i) blurring a face in the digital image data and (ii) overlaying a visual representation, e.g., an emoji or the face of the first user, on pixels indicative of the face in the digital image data. In some implementations, the system obtains, from the first client device, feedback data specifying additional faces to be obscured and obscures the additional faces in the digital image data. For example, as shown in FIG. 2E, the user can identify the user in the digital image file so that the system can obscure non-identified individual(s) in the digital image file. As shown in FIG. 2F, the non-identified individual in the image 252*b* in Jane's profile is obscured with a heart emoji.

In some implementations, the user preference specifies users in an approval category, where the users grant a permission to display their faces in the first user's profile. The system obtains, from a second client device associated with a second user, a privacy preference specifying approval to display a face of the second user in the digital image data associated with the profile of the first user. The system obscures the multiple unique faces in the digital image data except the face of the first user and the face of the second user. For example, as shown in FIG. 2H, the user can request the second user's approval, e.g., by providing a phone number associated with the second user.

The system stores the digital image data having the obscured faces in a database (610). The system can access the database and transmit the digital image data to a user who provided the digital image data or other users matched to the user. In some implementations, the system removes the digital image data having non-obscured faces from the database. In some implementations, the same digital image data get updated instead of generating new digital image data after applying an obscuring algorithm.

The system associates the stored digital image data with a profile associated with the first user in the social network (612). For example, the system updates a data field, within the digital image data, to indicate which profile the digital image data is associated with. Upon updating, the profile includes the stored digital image data that reflect obscured faces.

In some implementations, the system determines that the first user violates a privacy requirement of the social network and presents a warning indication to the first client device. The system obtains an indication, from a third client device associated with a third user matched to the first user, that at least one of the digital image data in the profile associated with the first user includes a second face other than the face of the first user and determines that the second face does not belong to users who approved usage of their faces to the first user. The warning indication, as shown in FIG. 4, can be presented on a particular image that caused the report. In some implementations, the system removes the particular image that caused the report without the first user's consent. In some implementations, the system removes the particular image after receiving same reports exceeding a pre-defined threshold number of times from multiple users.

In some implementations, the system blurs a portion of the digital image data, e.g., a body of a user in the digital image data. The system applies a second machine learning model configured to identify a portion of the digital image data that do not meet one or more safety criteria. The one or more safety criteria can include age-inappropriate contents, such as a naked body, an inappropriately dressed body, and an offensive body gesture. After applying the second machine learning model, the system obscures the portion of the digital image data.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A computer-implemented method comprising:

obtaining, from a first client device associated with a first user, digital image data, wherein the first user is one of a plurality of users of a social network;

determining that the digital image data includes an image of multiple unique faces;

applying, to the digital image data, a machine learning model configured to identify, among the multiple unique faces, a face of the first user;

selecting an obscuring mechanism that specifies a type of action to obscure image regions in the digital image data corresponding to the multiple unique faces except the face of the first user based on a preference of the first user;

obscuring, in the digital image data and using the type of action specified by the selected obscured mechanism based on the preference of the first user, the multiple unique faces except the face of the first user on the image regions;

storing the digital image data having the obscured faces in a database;

associating the stored digital image data with a profile associated with the first user in the social network;

obtaining, from the first client device, a plurality of digital image data that include an image of the face of the first user; and training, based on the plurality of digital image data, the machine learning model configured to extract features representative of the face of the first user.

2. The computer-implemented method of claim 1, wherein the digital image data comprise (i) one or more pictures, (ii) one or more videos, or both.

3. The computer-implemented method of claim 1, further comprising:

providing, to the first client device and at least some of a plurality of client devices associated with users of the social network, the digital image data.

4. The computer-implemented method of claim 1, further comprising:

prompting the first user to take a live selfie; and verifying an identity of the first user based on the live selfie.

5. The computer-implemented method of claim 1, further comprising:

in response to obtaining, from the first client device, feedback data specifying additional faces to be obscured, obscuring the additional faces in the digital image data.

6. The computer-implemented method of claim 1, wherein the obscuring mechanism comprises one or more of (i) blurring a face in the image regions in the digital image data and (ii) overlaying a visual representation on pixels indicative of the face in the image regions in the digital image data.

7. The computer-implemented method of claim 6, wherein the visual representation comprises one or more of an emoji and a face of the first user.

8. The computer-implemented method of claim 1, further comprising:

obtaining, from a second client device associated with a second user, a privacy preference specifying approval to display a face of the second user in the digital image data associated with the profile of the first user; and obscuring the multiple unique faces in the digital image data except the face of the first user and the face of the second user.

9. The computer-implemented method of claim 1, wherein the users of the social network are users matched to the first user on the social network.

10. The computer-implemented method of claim 1, wherein each of the digital image data is accompanied with a text caption.

11. The computer-implemented method of claim 1, further comprising:

determining that the first user violates a privacy requirement of the social network; and presenting, to the first client device, a warning indication.

12. The computer-implemented method of claim 11, wherein determining that the first user violates the privacy requirement of the social network comprises:

obtaining an indication, from a third client device associated with a third user matched to the first user, that at least one of the digital image data in the profile associated with the first user includes a second face other than the face of the first user; and determining that the second face does not belong to users who approved usage of their faces to the first user.

13. The computer-implemented method of claim 1, further comprising:

applying, to the digital image data, a second machine learning model configured to identify a portion of the digital image data that do not meet one or more safety criteria; and obscuring, in the digital image data, the portion of the digital image data.

14. The computer-implemented method of claim 13, wherein the portion of the digital image data that do not meet the safety criteria comprises age-inappropriate contents.

15. A system comprising:

one or more processors and one or more storage devices storing instructions that are operable, when executed by the one or more processors, to cause the one or more processors to perform operations comprising:

obtaining, from a first client device associated with a first user, digital image data, wherein the first user is one of a plurality of users of a social network;

determining that the digital image data includes an image of multiple unique faces;

applying, to the digital image data, a machine learning model configured to identify, among the multiple unique faces, a face of the first user;

selecting an obscuring mechanism that specifies a type of action to obscure image regions in the digital image data corresponding to the multiple unique faces except the face of the first user based on a preference of the first user;

obscuring, in the digital image data and using the type of action specified by the selected obscured mechanism based on the preference of the first user, the multiple unique faces except the face of the first user on the image regions;

storing the digital image data having the obscured faces in a database;

associating the stored digital image data with a profile associated with the first user in the social network;

obtaining, from the first client device, a plurality of digital image data that include an image of the face of the first user; and training, based on the plurality of digital image data, the machine learning model configured to extract features representative of the face of the first user.

16. The system of claim 15, further comprising:

prompting the first user to take a live selfie; and verifying an identity of the first user based on the live selfie.

17. The system of claim 15, further comprising:

obtaining, from a second client device associated with a second user, a privacy preference specifying approval to display a face of the second user in the digital image data associated with the profile of the first user; and obscuring the multiple unique faces in the digital image data except the face of the first user and the face of the second user.

18. The system of claim 15, further comprising:

applying, to the digital image data, a second machine learning model configured to identify a portion of the digital image data that do not meet one or more safety criteria; and obscuring, in the digital image data, the portion of the digital image data.

19. A non-transitory computer-readable medium, comprising software instructions, that when executed by a computer, cause the computer to execute operations comprising:

obtaining, from a first client device associated with a first user, digital image data, wherein the first user is one of a plurality of users of a social network;

determining that the digital image data includes an image of multiple unique faces;

applying, to the digital image data, a machine learning model configured to identify, among the multiple unique faces, a face of the first user;

selecting an obscuring mechanism that specifies a type of action to obscure image regions in the digital image data corresponding to the multiple unique faces except the face of the first user based on a preference of the first user;

obscuring, in the digital image data and using the type of action specified by the selected obscured mechanism based on the preference of the first user, the multiple unique faces except the face of the first user on the image regions;

storing the digital image data having the obscured faces in a database;

associating the stored digital image data with a profile associated with the first user in the social network;

obtaining, from the first client device, a plurality of digital image data that include an image of the face of the first user; and training, based on the plurality of digital image data, the machine learning model configured to extract features representative of the face of the first user.

* * * * *